June 10, 1930.　　　M. PEARSON　　　1,763,321
CAN CLEANING AND STERILIZING APPARATUS
Filed Jan. 13, 1927　　2 Sheets-Sheet 1
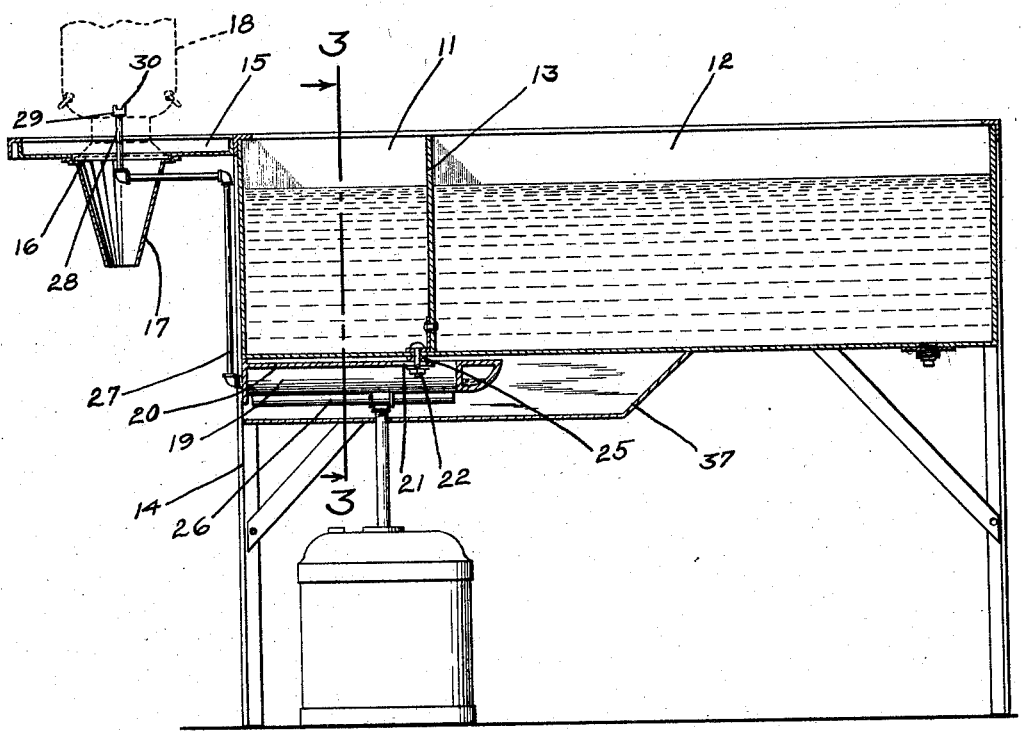
FIG. 1
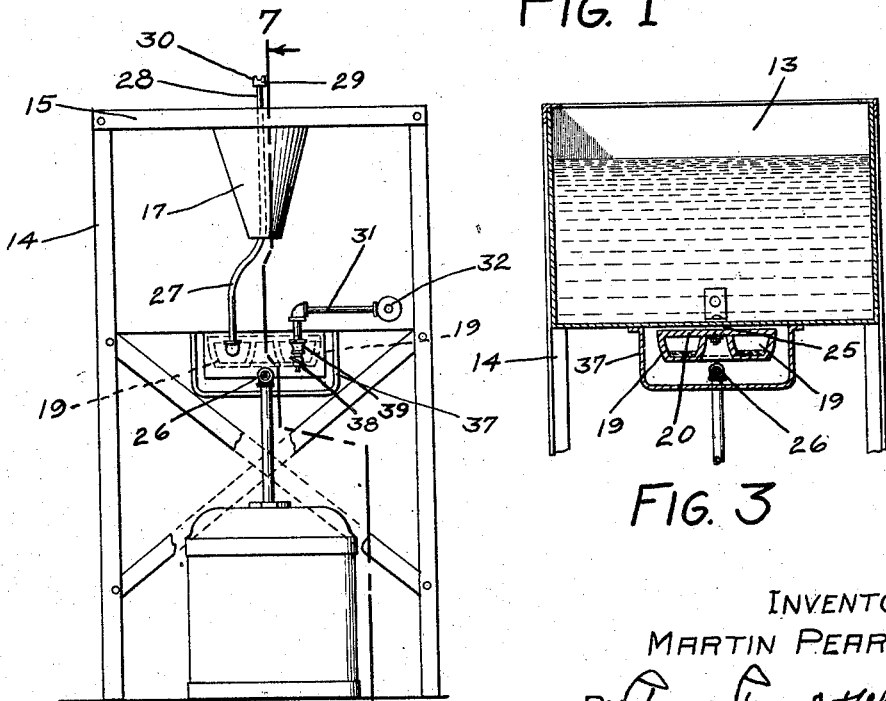
FIG. 2
FIG. 3
INVENTOR
MARTIN PEARSON
BY
ATTORNEYS June 10, 1930.  M. PEARSON  1,763,321
CAN CLEANING AND STERILIZING APPARATUS
Filed Jan. 13, 1927   2 Sheets-Sheet 2

INVENTOR
MARTIN PEARSON
ATTORNEYS

Patented June 10, 1930

1,763,321

UNITED STATES PATENT OFFICE

MARTIN PEARSON, OF ROBBINSDALE, MINNESOTA, ASSIGNOR TO PEARSON MANUFAC-
TURING COMPANY, INC., OF ROBBINSDALE, MINNESOTA, A CORPORATION OF MIN-
NESOTA

CAN CLEANING AND STERILIZING APPARATUS

Application filed January 13, 1927. Serial No. 160,884.

This invention relates to improvements in can cleaning and sterilizing apparatus and is designed as an improvement over the pending application of James A. Dary, Serial No. 15,870, filed March 16, 1925.

An object of this invention is to provide an apparatus comprising a steam generator of substantially U-shaped formation and having its legs connected together by a web extending substantially the full length thereof, and, further having a vertical wall or shield arranged at the receiving and discharge ends of the generator cooperating with the web and the inner side walls of the legs to provide means for confining the heat to the generator to increase the efficiency of the apparatus.

A further object is to provide a can cleaning and sterilizing apparatus comprising a water receptacle having a relatively larger tank arranged adjacent thereto and having a U-shaped horizontally disposed steam generator arranged beneath the receptacle and tank, the receptacle having a connection with one leg of the generator for supplying water thereto, the other leg of the generator having a steam discharge pipe leading therefrom to a nozzle suitably positioned to deliver steam to the interior of a can for sterilizing purposes, said generator having the dual function of supplying steam for sterilizing cans and other utensils and also for heating the water in the receptacle and tank.

A further object is to provide a can cleaning and sterilizing apparatus comprising a water receptacle and tank having flat bottoms, beneath which a steam generator is arranged over a suitable heating means, the water receptacle having a connection with the generator for supplying water thereto, which connection is provided with means for preventing the steam from entering the water pipe.

Other objects of the invention reside in the general construction of steam generator; the manner of securing the generator to the bottom of the water receptacle, whereby an air space is provided therebetween; the means provided for confining the heat to the generator to increase the efficiency of the generator; the pronged steam discharge nozzle whereby a cover or other receptacle may be placed over the nozzle without interrupting the flow of steam therefrom; the particular method of connecting the water supply pipe to the generator, and, in the duct provided in the nipple mounted within the generator and communicating with the water supply pipe which is so arranged as to normally be below the level of the water in the generator whereby it prevents back pressure of steam in the water supply pipe.

The particular object of the invention, therefore, is to provide an improved can cleaning and sterilizing apparatus.

Other objects of the invention will appear from the following description and accompanying drawing and will be pointed out in the annexed claims.

In the drawings there has been disclosed a structure designed to carry out the various objects of the invention, but it is to be understood that the invention is not confined to the exact features shown, as various changes may be made within the scope of the claims which follow.

In the accompanying drawings forming part of this specification:

Figure 1 is a longitudinal sectional view on the line 1—1 of Figure 2;

Figure 2 is an end elevation of Fiugue 1;

Figure 3 is a detail sectional view on the line 3—3 of Figure 1;

Figure 4:
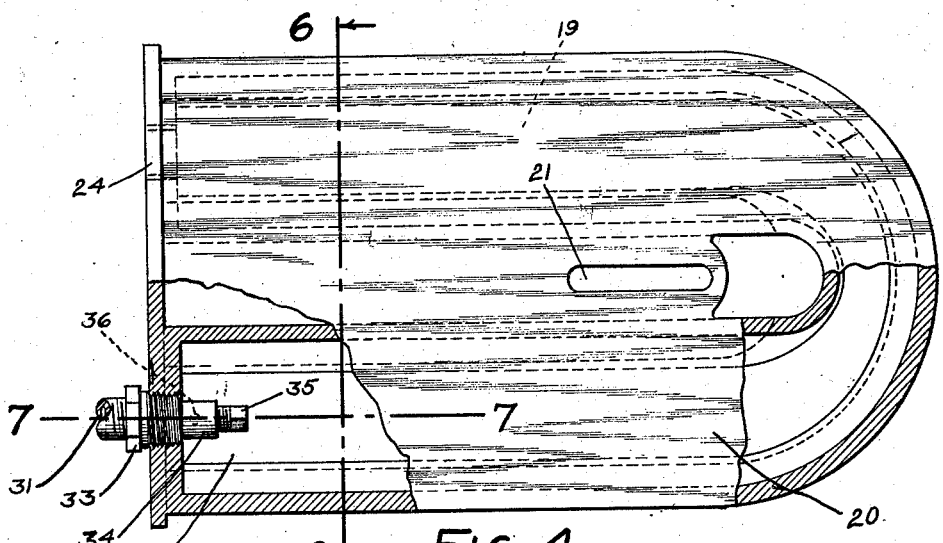
Figure 4 is an enlarged plan view of the generator removed from the apparatus.

The apapratus featured in this invention comprises a water receptacle 11 and a tank 12 separated by a partition 13 as shown in Figure 1. A drain plug is provided in the tank 12 for draining the contents. The receptacle and tank are mounted upon a suitable frame structure 14, shown in Figures 1 and 2. A can support 15 is provided at one side of the receptacle 11 and has a central opening 16 therein beneath which a depending funnel 17 is arranged. The support 15 is adapted to receive a can 18, as shown in dotted lines.

Figures 5, 6:
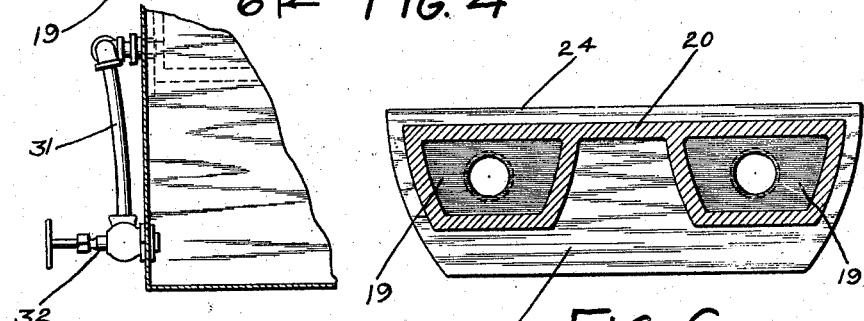
Figure 5 is a detail sectional view showing the water supply pipe connecting the steam generator with the water receptacle.
Figure 6 is a cross-sectional view on the line 6—6 of Figure 4.

A feature of this invention resides in the construction of the steam generator, mounted beneath the receptacle 11 and tank 12. This generator is substantially U-shaped in form and comprises legs 19, connected together at their upper portions by a web 20, extending substantially the full length of the legs. An elongated opening 21 is provided in the web 20 adapted to receive a bolt 22 for securing the generator to the bottom of the receptacle. A spacing washer 25 is interposed between the bottom of the receptacle 11 and the web 20 to space the top of the generator from the bottoms of the receptacle and tank as shown. The bolt 22 passes through this washer. A wall 23 connects together the intake and the discharge ends of the leg members 19 and is arranged at right angles to the web 20, said wall and web co-operating with the leg members 19 to confine the heat to the central portion of the generator. The upper marginal edge 24 of the wall 23 extends above the top of the leg members 19 and the top of the web 20 so as to engage the bottom of the water receptacle and aid in spacing the generator from the bottom of said receptacle. By constructing the generator as above described, the heat impinging thereagainst, from a suitable burner 26, will be confined beneath the generator resulting in more rapid generation of steam. The generator is integrally formed of cast metal as shown in Figures 4 and 6. A steam discharge pipe 27 leads from the discharge leg of the generator and has its upper end 28 positioned within the opening 16 in the can support 15. A nozzle 29 is terminally mounted upon the pipe 28, and is provided with upstanding prongs or forks 30, adapted to engage a device such as a can cover, for the purpose of spacing it from the nozzle discharge to permit free discharge of steam from the nozzle, when a cover or other article is thus positioned upon the nozzle.

A water supply pipe 31 connects the intake leg of the generator with the water receptacle 11 as shown in Figures 2 and 5. This supply pipe has a valve 32 for controlling the flow of water from the receptacle to the generator.

Figure 7:
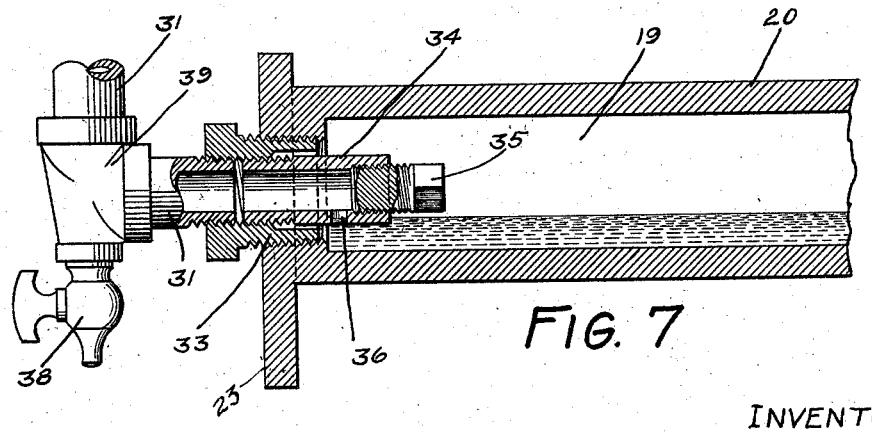
Figure 7 is an enlarged detail sectional view on the line 7—7 of Figure 4, showing the means provided in the steam generator for preventing back pressure of steam in the water supply pipe.

Another feature of the invention resides in the means provided for preventing the steam from entering the water supply pipe 31 and creating a back pressure therein. Such means is shown in Figure 7. A threaded bushing 33 is mounted in the end of the intake leg of the generator and is internally threaded to receive the end of the supply pipe 31. A nipple 34 is also received in threaded engagement with the interior of the bushing 33 and extends into the generator leg and has a plug 35 closing the end thereof. A duct or port 36 is provided in the bottom wall of the nipple 34 and establishes communication between the supply pipe 31 and the interior of the generator. The discharge end of the duct 36 is normally below the level of the water in the generator, as shown in Figure 7, thereby preventing steam from entering the water supply pipe 31. This is an important feature, as it causes all of the steam to be discharged from the nozzle 29, positioned above the can support 15 thus utilizing all of the steam for cleaning and sterilizing purposes. A reducing T 38 is interposed in the pipe 31 and has a drain cock 39 mounted therein to provide means for draining surplus water from the generator 19, in the event that the latter accidentally becomes flooded.

In operation, water is admitted to the generator by opening the valve 32, after which the heating means or burner will vaporize the water in the manner similar to the function of an ordinary flash boiler. The supply of water to the generator is controlled by the valve 32, and is governed by the intensity of the heat of the burner or its ability to transform the water into steam. The top wall of the generator, including the central wall 20, is spaced from the bottoms of the receptacle and tank, as shown in Figure 1, to provide an air circulating passage therebetween to prevent the boiler from damaging the bottoms of the receptacle and tank as a result of excessive heat. A housing 37, provides a closure for the steam generator and also the burner 26, thereby confining the heat to the burner and the bottoms of the receptacle 11 and tank 12. The major portion of the generator being arranged beneath the water receptacle 11, the water contained therein will be heated to a relatively high temperature, as compared to the water contained in the tank 12. The generator therefore also functions to pre-heat the water delivered thereto, thereby increasing its efficiency as a steam generator.

I claim as my invention:

1. An apparatus of the class described comprising a water receptacle, a support for a can having an opening therein, a steam generator beneath the receptacle having a valve-controlled communication with the receptacle, said generator comprising legs connected at one end to form a U-shaped structure, and a web connecting together said legs and cooperating therewith to form a heating chamber.

2. An apparatus of the class described comprising a water receptacle, a can support having an opening therein over which the can is positioned, a steam generator arranged beneath the water receptacle, heating means beneath the generator, said generator being U-shaped in form and having a web connecting together its legs substantially the full length thereof, a wall connecting together the intake and discharge ends of the legs and arranged at right angles to said web, said wall and web cooperating with the legs to confine the heat to the central portion of the generator.

3. An apparatus of the class described, comprising in combination, a water receptacle having a flat bottom, a support adapted to receive a can, a U-shaped steam generator arranged beneath the water receptacle in close proximity thereto, a web connecting together the legs of the generator at their upper portions and extending substantially the full length of the legs, heating means beneath the generator, a vertical wall between the intake and discharge ends of the generator legs, a valved intake connecting the receptacle with one of the generator legs for supplying water to the generator, and a steam discharge pipe leading from the other leg and connected with a steam discharge nozzle positioned in the can support.

4. An apparatus of the class described including a horizontal steam generator substantially U-shaped in form, a web connecting together the upper portions of the legs of the generator, a vertical wall at one end of the generator having its lower edge extending beneath the bottoms of the generator legs to provide a shield adapted to confine the heat to the generator, and the upper marginal edge of the wall extending above the tops of the legs and the connecting web therebetween and adapted to engage the bottom of the water receptacle to space the generator from the receptacle bottom.

5. An apparatus of the class described, comprising in combination, a water receptacle, a relatively larger tank adjacent thereto, a steam generator beneath the receptacle and tank, means for heating the generator, a water supply pipe connecting the receptacle with one leg of the generator and having a valve therein for controlling the flow of water to the generator, a support adapted to receive a can, a steam discharge pipe leading from the other leg of the generator to a discharge nozzle positioned above the support, a nipple terminally provided on said water supply pipe and extending into the generator and having its end closed, a discharge aperture in the bottom wall of the nipple communicating with the interior of the generator, so as to lie below the normal level of water in the generator to provide a seal for preventing the escape of steam through the water supply pipe.

6. An apparatus of the class described including a water receptacle, a steam generator, beneath the receptacle, means for heating the generator, a bushing terminally mounted in one leg of the generator, a water supply pipe having one end connected with the bushing and its other end with the water receptacle for supplying water to the generator, a nipple also secured to the bushing and extending into the generator, a threaded plug terminally mounted in said nipple, an aperture in the wall of the nipple establishing communication between the water supply pipe and the interior of the generator, said aperture being in the bottom wall of the nipple and positioned to lie below the normal level of the water in the generator, thereby preventing steam from escaping through said water supply pipe, and a steam discharge pipe connected with the other leg of the generator.

In witness whereof, I have hereunto set by hand this 7th day of January, 1927.

MARTIN PEARSON.